A. LUCETTI.
Ice-Cream Freezers.
No. 141,060.   Patented July 22, 1873.
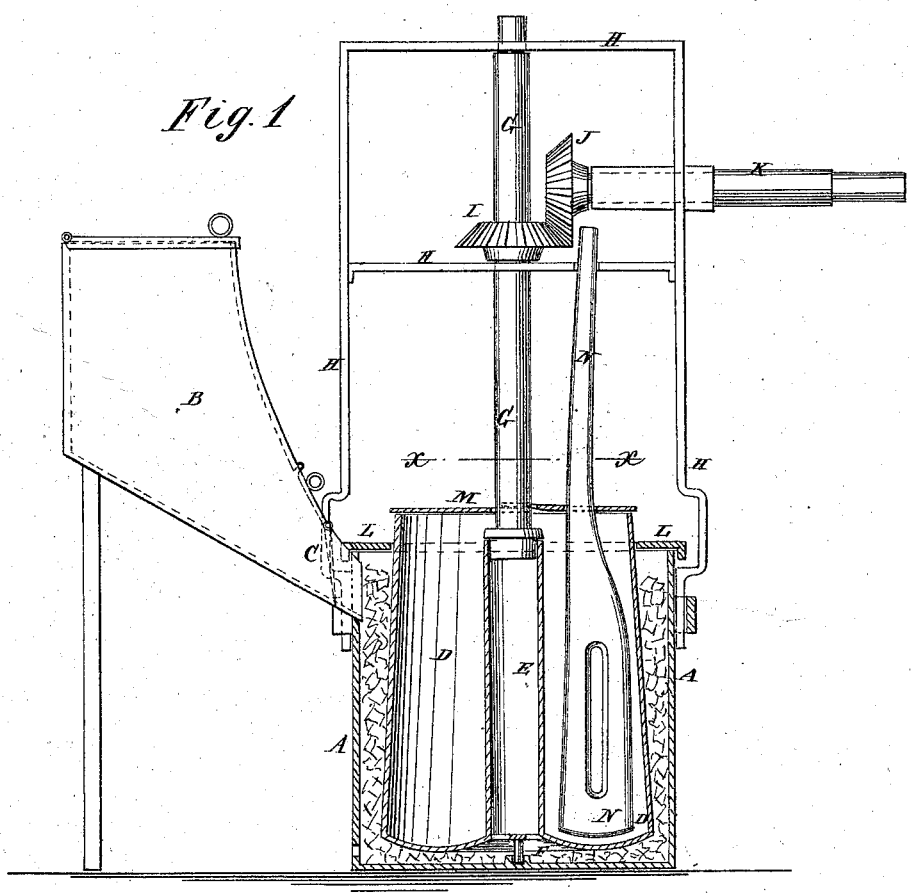
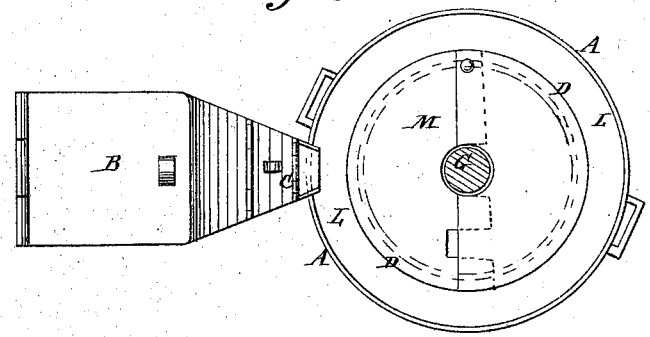
Witnesses:
A. W. Almquist
C. Sedgwick
Inventor,
A. Lucetti.
Per
Munn & Co.
Attorneys.

UNITED STATES PATENT OFFICE

ANTONIO LUCETTI, OF NEW YORK, N. Y.

IMPROVEMENT IN ICE-CREAM FREEZERS.

Specification forming part of Letters Patent No. 141,060, dated July 22, 1873; application filed June 21, 1873.

*To all whom it may concern:*

Be it known that I, ANTONIO LUCETTI, of the city, county, and State of New York, have invented a new and useful Improvement in Ice-Cream Freezers, of which the following is a specification:

Figure 1 is a detail vertical section of my improved ice-cream freezer. Fig. 2 is a top view of the same, partly in horizontal section, through the line $x\ x$, Fig. 1.

Similar letters of reference indicate corresponding parts.

My invention has for its object to furnish an improved apparatus for freezing ice-cream, which shall be simple in construction, convenient in use, and effective in operation, freezing the cream quickly, and requiring much less labor to manipulate it than freezers constructed in the ordinary manner. The invention consists in the open-bottomed tube passing up through the center of the cream-receiver; in the combination of the ice-receptacle, provided with a gate, with the tub of an ice-cream freezer; and in an ice-cream freezer formed of the tub, the ice-receptacle provided with a gate, the cream-receiver, the open-bottomed tube, the shafts, the gear-wheels, the frame, the covers, and the spatula, constructed and operating, in connection with each other, as hereinafter fully described.

A is the tub of the freezer, which may be made of any convenient size, and with the side of which is connected the ice-receptacle B, which is made with a spout leading into the tub A, through which the pieces of ice are allowed to flow into the said tub. The spout of the receptacle B is provided with a gate, C, to enable the outflow of the ice to be regulated as required. D is the cream-receiver, which is made of such a size as to leave space around it for the ice. E is a tube extending up through the center of the receiver D, and the lower end of which is connected with the bottom of the said receiver D, which bottom has a hole formed through it corresponding with the cavity of the tube E. The open-bottomed tube E allows the cold air from the ice to pass up into the middle part of the receiver D, so as to freeze the middle part of the cream as quickly as the outer parts. To bars crossing the open lower end of the tube E, and secured to the bottom of the receiver D, is attached a pivot, F, which works in a socket or step formed in or attached to the bottom of the tub A. With the upper end of the tube E is connected the lower end of a vertical shaft, G, which works in bearings in a frame, H, attached to the tub A or to other suitable support. To the shaft G is attached a bevel-gear wheel, I, into the teeth of which mesh the teeth of the bevel-gear wheel J attached to the inner end of the horizontal shaft R, which revolves in a long bearing attached to the frame A, and to the outer end of which is attached a crank for operating the machine. The tub A is provided with a ring-cover, L, and the receiver D is provided with a cover, M, which has a hole in its center for the passage of the shaft G, and a slot in it to receive the spatula N, the lower part of which may have a longitudinal slot formed in it, as shown in Fig. 1.

In using the freezer, the receiver is revolved by turning the crank with the right hand, and the spatula N is controlled and guided with the left hand. The apparatus should be so arranged that the operator, while turning the crank with his right hand, can open the gate C with his left hand to admit ice to the tub A as required.

Having thus described my invention, I claim as new and desire to secure by Letters Patent—

1. The open-bottomed tube E, passing up through the center of the cream-receiver D, substantially as herein shown and described, and for the purpose set forth.

2. The combination of the ice-receptacle B provided with a gate, C, with the tub A of an ice-cream freezer, substantially as herein shown and described.

3. An ice-cream freezer formed of the tub A, the ice-receptacle B provided with a gate, C, the cream-receiver D, the open-bottomed tube E, the shafts G and K, the gear-wheels I and J, the frame H, the covers L and M, and the spatula N, constructed and operating, in connection with each other, substantially as herein shown and described.

ANTONIO LUCETTI.

Witnesses:
JAMES T. GRAHAM,
ALEX. F. ROBERTS.